United States Patent Office 3,120,538
Patented Feb. 4, 1964

3,120,538
3-CYANOMETHYL-1,2,3,4,6,7,12,12b-OCTAHYDRO-PYRIDO-(2,1-a)-β-CARBOLINE
Jan Strating, Groningen, Netherlands, assignor to North American Philips Company, Inc., New York, N.Y., a corporation of Delaware
No Drawing. Filed Feb. 24, 1961, Ser. No. 91,338
Claims priority, application Netherlands Mar. 12, 1960
1 Claim. (Cl. 260—293)

It is known that the Rauwolfia-alkaloid reserpine has a number of important pharmacological properties, so that this substance has been used for medical purposes both as a blood-pressure reducing means and as a sedative.

After it was determined that reserpine is a compound of the Formula I

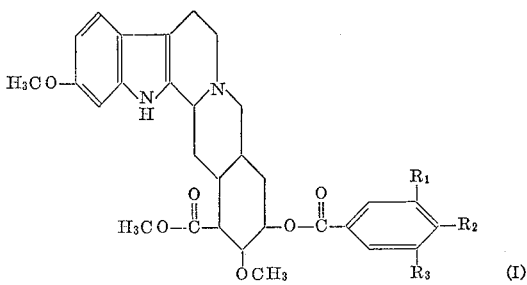

wherein $R_1$–$R_3$ are methoxy groups, several efforts were made to find reserpine analogues having either the sedative or the blood-pressure reducing activity of reserpine, but not both at the same time, since when using a sedative the blood-pressure decreasing activity is generally not desired and when using a blood-pressure reducing means the sedative activity is generally not desired.

Thus, groups of compounds of the Formula I have been described which differ from reserpine only in the radicals $R_1$–$R_3$. One of these groups has substantially the central-depressing action of reserpine with a small effect upon blood pressure and another group has substantially the hypotensive activity and, in addition, a much weaker depressive than that of reserpine.

Now, it has been found that compounds of the Formula III

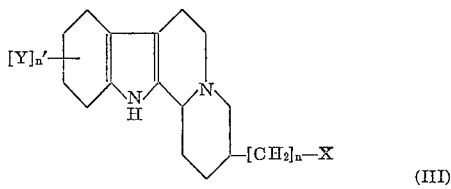

wherein Y is a free, etherified or esterified hydroxyl group or a halogen atom and $n'=0$, 1 or 2, X is a free, etherified or esterified hydroxyl group, or a —C≡N group, or a carboxyl group which may be esterified by aliphatic alcohol with 1 to 4 carbon atoms, and $n=0$–4, have a similar action upon the central nervous system as reserpine, but have substantially no influence upon blood pressure. Y for instance is a free hydroxyl group or a hydroxyl group which is etherified with an aliphatic alcohol with 1–4 carbon atoms, for instance methanol, ethanol, propanol, isopropyl alcohol, butanol or secondary or tertiary isobutyl alcohol or with a phenylsubstituted alcohol such as benzyl alcohol or phenyl ethyl alcohol or a hydroxyl group esterified with a lower fatty acid for instance acetic acid, propionic acid, butyric acid or valeric acid with an aromatic acid for instance benzoic acid, 3,5 dinitro benzoic acid or phenyl acetic acid or with a sulfonic acid for instance p-toluenesulfonic acid. In the case that X is an etherified or esterified hydroxyl group for instance this hydroxyl group is etherified or esterified with one of the above-mentioned alcohols and acids. If X is an esterified carboxyl group this acid for instance is esterified with methanol, ethanol, propanol, isopropyl alcohol, butanol or secondary or tertiary isobutyl alcohol.

The present invention provides novel compounds not described in literature before, which can be used therepeutically as sedatives with reserpine activity without hypotensive additional action, while such compounds can be manufactured in a simpler manner than reserpine and reserpine analogues having a substantially sedative activity.

Compounds according to the invention have a reserpine-like central-depressing activity when administered to mammalia in doses of from 1 to 200 mg./kg. 3 to 5 times per day. They may be worked in a known manner into pharmaceutical preparations by mixing them with, or dissolving or dispersing them in, solid or liquid carriers.

The activity of the compounds was determined in tests with mammalia.

For example, after intraperitoneal administration of doses from 10 to 100 mg./kg. to mice, the animals were found to be strongly sedated shortly after the administration, which became clearly more particularly with the ptosis occurring.

The sedating action clearly appeared also from a potentiation of other central depressives.

This potentiation was measured in two ways:

Firstly, it was examined to what extent the nembutal narcosis, the narcosis after administration of a preparation of 5-ethyl-5-(1'-methylbutyl)barbituric acid, was lengthened by a previous treatment with compounds according to the invention. The results of these tests, as carried out for example with two compounds according to the invention, are summarized in Table I.

TABLE I

| Substance | Animal sex | Animal number | Dose, mg./kg. I.P. | Period of the previous treatment in minutes | Duration of narcosis in minutes |
|---|---|---|---|---|---|
| Test | ♂ | 60 | | | 33.2 |
| Test | ♀ | 30 | | | 31.3 |
| Cria 1 | ♂ | 10 | 50 | 30 | 186 |
| Cria 1 | ♂ | 10 | 50 | 60 | 98 |
| Cria 1 | ♂ | 10 | 50 | 120 | 48.5 |
| Cria 204 | ♀ | 10 | 100 | 30 | 186.5 |
| Cria 204 | ♀ | 10 | 100 | 60 | 202.5 |
| Cria 204 | ♀ | 9 | 100 | 120 | 186 |

The duration of the narcosis with mice each weighing from 15 to 20 g. was measured after intraperitoneal administration of 50 mgs./kg. of nembutal. In the tests, sedative was not previously administered. The compounds indicated by Cria 1 and Cria 204 are substances of the Formula III, wherein $n'=0$, $n=1$ and X=OH; and $n'=0$, $n=1$ and X=

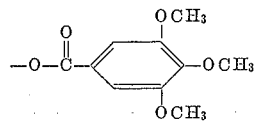

which substances were administered, prior to the injection with nembutal, in doses indicated in column 4, to numbers of mice indicated in column 3, for a number of minutes indicated in column 5.

In another method, the potentiation of narcotics by administration of compounds according to the invention was measured by testing during a previous treatment with what dose of the substance to be tested a normally non-narcotic dose of intravenously administered hexobarbital, a preparation of 5-($\Delta^{1,2}$-cyclo-hexenyl)-5-methyl-N-methylbarbituric acid, does bring about narcosis.

The substance to be tested was intraperitoneally administered to a number of mice half an hour before the administration of hexobarbital and that dose of the substance to be tested was measured which was sufficient to bring about narcosis with 50% of the animals: the E.D.–50 of the substance to be tested. These doses were found to be

|  | Mg./kg. |
|---|---|
| For Cria 1 | 40.8 |
| For Cria 204 | 12.2 |
| For Crip 207 | 3.5 |

Crip 207 is a compound of the Formula III, wherein $n=1$ and $n'=0$ and $X=-C\equiv N$.

The tranquilizing activity of compounds according to the invention was measured on the suppression of the fighting tendency of two mice which were subjected to an electroshock through their legs. In these tests, for example with Cria 1 and Cria 204 with intraperitoneal administration of the pharmacon half an hour before the test there were found E.D. 50's of 50.1 mg./kg. and 5.1 mg./kg. respectively, that is to say that with these doses the fighting tendency was suppressed with exactly 50% of the animals tested. The absence of the blood-pressure reducing action was determined, for example, by measuring the blood pressure of a cat narcotized with chloralose upon administration of Cria 1.

With doses up to 2 mg./kg. no influence upon blood pressure could be found. With higher doses up to 8 mg./kg. only a short decline in blood pressure occurred.

Compounds according to the invention may be maufactured by processes known for the maufacture of analogous compounds and by similar processes.

Known processes for building up the four-ring system of the Formula IV

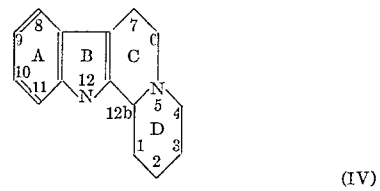

(IV)

which enter into account, for example, for the manufacture of compounds according to the invention, may be divided into three groups.

In the process I, the starting material is formed by beta-carboline derivatives, which thus already contain the three-ring system ABC, in which substituents are present in the ring C at the 1- and the 2-positions of the carboline skeleton, which may be cyclized into ring D.

Thus, for the manufacture of compounds according to the invention use may be made of a compound corresponding to the general Formula V

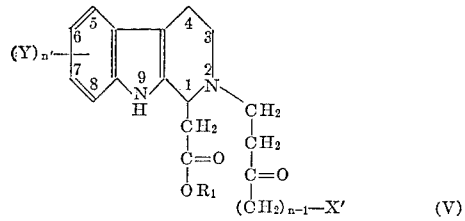

(V)

or a salt thereof, wherein $R_1$ is an alkyl group with 1 to 4 carbon atoms and $X'=X$ or a group which can be converted into the group X. The substituents are cyclized into the ring D by means of a Dieckmann condensation, whereupon a compound with the four-ring system of Formula IV may be isolated, which has a keto group at the 2-position and is substituted by a

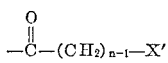

group at the 3-position. A compound according to the invention is obtained by reduction of one or both carbonyl groups and, if necessary, conversion of the group X' into a group X.

For example a 1-carbaethoxymethyl-1,2,3,4, tetrahydrobetacarboline is converted by heating with the aid of an ester of a lower aliphatic alcohol, for example the ethyl ester of acrylic acid, into a compound of the Formula VI

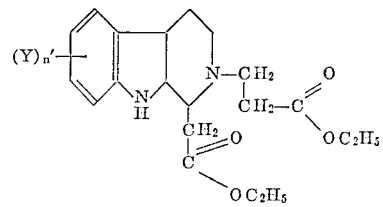

(VI)

or a salt thereof, which compound is cyclized by means of a Dieckmann condensation into a mixture of two compounds with a fourring system of Formula IV, which compounds carry a keto group at the 2-position and are substituted by a carbaethoxy group at the 1-position and the 3-position respectively.

The last-mentioned compound is isolated from the mixture and, subsequently, the keto group at the 2-position is converted by known processes into a methylene group. Such conversion may be effected, for example, by catalytic reduction, for example with the aid of $Pt/H_2$, followed by a treatment with phosphorous and iodohydric acid.

The carbaethoxy group at the 3-position may be converted, for example by reduction with the aid of a metal hydride or a metal-alkyl hydride into a carbinol group which is etherified or esterified, if desired, by known processes. The esterified carbinol group may be converted by treatment with KCN into a $-CH_2-C\equiv N$ group. It is also possible by known methods to lengthen this lateral chain at the 3-position to form a chain$(CH_2)_nX$, wherein $n>1$. The carbinol group, for example, may be converted into a halogen-methyl group which is subsequently converted into a Grignard compound which in turn is converted by reaction with $CO_2$ into an acid according to the invention which may be esterified, if desired, with a lower aliphatic alcohol or reduced into a hydroxy ethyl group. Thus, the substituent at the 3-position may be lengthened by a methylene group.

The Dieckmann cyclization reaction may be carried out, for example, by heating the compound of Formula V in an inert solvent, for example in petroleum ether or dry benzene or toluene in the presence of an alkaline-metal oxide, for example sodium methoxide.

In method II, the four-ring skeleton of the compounds according to the invention is built up by cyclizing a compound of the Formula VII

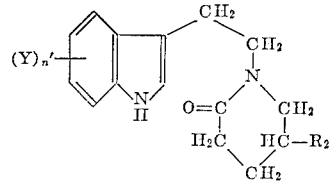

(VIII)

or a salt thereof, in a Bischler-Napieralsky reaction into a compound of the Formula VIII

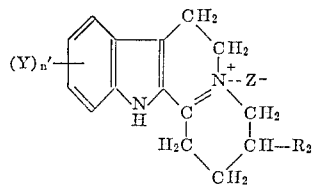

(VIII)

wherein $R_2=(CH_2)_n-X$ or a group which may be converted into it and $Z^-$ is an anion of an acid, preferably an inorganic acid, for example hydrochloric acid, sulphuric acid or perchloric acid.

Reducing the double bond in the D-ring of the compound of Formula VIII results in a compound having the skeleton of Formula IV. The Bischler-Napieralsky reaction is carried out in known manner by boiling the compound of Formula VII in an inert solvent, preferably in benzene or toluene with $POCl_3$. After decanting the cooled solution into a cold aqueous solution of a strong acid, the salt of Formula VIII is obtained.

The reduction of the double bond in the compound of Formula VIII for obtaining a compound having the skeleton of Formula IV may be effected by methods known for such reductions, for example with an alkaline metal or alkaline-earth metal and an alcohol, by catalytic hydrogenation, for example with $Pt/H_2$ or with zinc and $HClO_4$, or with a metal hydride or a metal-alkyl hydride, for example $LiAlH_4$ or di-isobutylaluminium hydride.

Very good yields are obtained if the compound of Formula VIII is reduced in an ethereal solution in tetrahydrofurane or in petroleum ether with the aid of a metal hydride or a metal-alkyl hydride, for example $LiAlH_4$ or di-isobutylaluminium hydride.

Compounds corresponding to Formula VII are obtained, for example, by alkylizing a tryptamine, which may be substituted in the benzene ring, or a salt thereof, with a compound of Formula IX

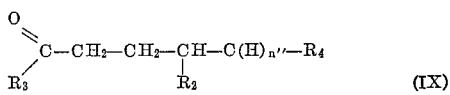

wherein $R_3$ is an alkoxyl group with 1 to 4 carbon atoms, $R_2$ has the significance mentioned hereinbefore and $R_4$ is a halogen atom, preferably a chlorine atom or a bromium atom, in which event $n''=2$, or a double-bonded oxygen atom, in which $n''=1$.

The secondary amine is cyclized by heating into a compound corresponding to Formula VII.

A reductive alkylization of a tryptamine, which may be substituted in the benzene ring, is carried out, for example, with the alpha-aldehydo-glutaric diethyl ester. This compound is obtained in the enol state by reaction of the diethylester of glutaric acid with ethyl formiate.

This alkylising reaction may be carried out in two steps, at first the enamine of Formula IX

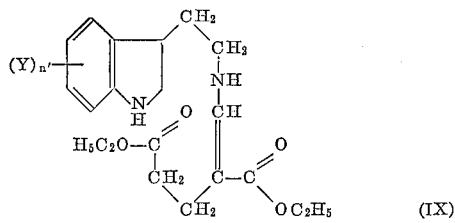

being obtained, which is converted by catalytic reduction, followed by cyclization, into a compound corresponding to Formula VII.

Compounds of Formula VII may also be manufactured, for example, by reaction of a tryptyl halide which may be substituted in the benzene ring, with a piperidine derivative of Formula X

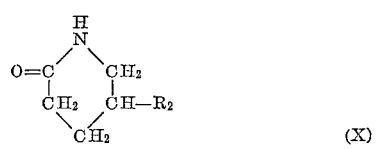

wherein $R_2$ has the significance described hereinbefore.

In method III, the rings A and B are built up on a compound already containing the rings C and D of the skeleton of Formula IV by means of a Fischer indolsynthesis.

A compound of Formula XI

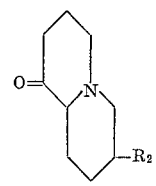

or a salt thereof, wherein $R_2=$ —$(CH_2)_nX$, or a group which can be converted into it, is caused to react with a phenylhydrazine, which may be substituted in the benzene ring, for manufacturing a compound corresponding to Formula XII

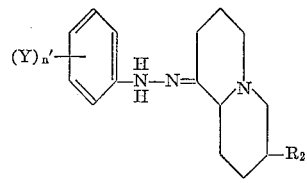

This reaction may be carried out in the manners known for manufacturing phenylhydrazones, for example by boiling the mixture of the compound of Formula XI and the phenylhydrazine in a solvent. Very satisfactory yields were obtained by using as a solvent a mixture of icy vinegar and ethanol, cooling the mixture after boiling for about half an hour, dissolving the reaction mixture in ether and, subsequently, adding a strong inorganic acid, for example perchloric acid, whereupon the salt of the compound corresponding to Formula XII crystallizes. The ring B of the skeleton of Formula IV is subsequently formed in a manner known for the Fischer indolsynthesis, for example by dissolving the compound of Formula XII in ethanol, leading through the solution for saturation hydrochloric gas and leaving untouched the mixture saturated with hydrochloric acid at room temperature for 10 to 20 hours. After the addition of ether, the hydrochloric-acid of the compound having the skeleton of Formula IV crystallizes.

*Example I.—3-Hydroxymethyl 1,2,3,4,6,7,12,12b-Octahydropyrido(2,1 a)-β-Carboline*

(A) MANUFACTURE OF α-OXYMETHYLENE-GLUTARIC DIETHYL ESTER 28 gs. (1.22 at.) of Na and 800 mls. of absolute toluene were introduced into a three-neck flask of 5 litre with two branch tubes, provided with a vibrating stirrer, a thermometer, a drop funnel and a cooler, closed by a chlorcalcium tube filled with KOH. The assembly was placed in an oil bath and boiled for some minutes while stirring. Subsequently, the oil bath was removed and the stirring process discontinued after cooling below the melting point of sodium (97.5°). Subsequently, a mixture consisting of 200 gs. (1.06 mol.) of glutaric diethylester and 124 gs. (1.68 mol) of ethylformiate was added by dripping within 1.5 hours while cooling in ice and stirring. The stirring process was continued for another 20 hours, initially while cooling in ice, but for the last 10 hours at room temperature. The yellow jelly-like mass was poured into 2 litres of water containing 1 kg. of ice. The toluene layer was isolated and washed with water, whereupon the aqueous layers were washed twice with ether. Subsequently, the light-yellow layer of water was acidified with 80%-ic phosphoric acid and the resulting oil isolated. The water layer was shaken another four times with 250 mls. of ether and these ether layers were added to the isolated oil, whereupon the ethereal solution was washed once more with little water. After drying above $MgSO_4$ and distillation of the ether, the residue was distilled in vacuo through a Vigreux-fractionating column of 10 ccs. The following fractions were obtained:

(1) 11 gs. having a boiling point up to 105°/0.8 mm. (temperature of the bath up to 145°), $n_D^{20}$ 1.4410.

(2) 106 gs. having a boiling point up to 105° to 107°/0.8 mm. (temperature of the bath up to 145°), $n_D^{20}$ 1.4502. Output 46%.

(3) 13 gs. having a boiling point of 107° to 115°/0.08 mm. (temperature of the bath 145–200°), $n_D^{20}$ 1.4495. Output 6%.

Analysis of fraction 2: Found C, 55.3; H, 7.3.

$C_{10}H_{16}O_5$ (216.24): Calculated C, 55.54; H, 7.46.

The compound was for the greater part or wholly in the enol state. The I.R. absorption spectrum showed a broad OH-band at 2500–3500 cm.$^{-1}$ and a C=C band at 1660 cm.$^{-1}$.

The index of refraction $n_D^{20}$ increased to 1.4551 after some weeks stay and thereafter remained substantially constant. Redistillation produced an index of refraction $n_D^{20}$ 1.4504. The variation in the index of refraction was not accompanied by a noticeable variation in the I.R. absorption spectrum.

(B) COUPLING OF TRYPTAMINE WITH α-OXYMETHYLENE-GLUTARIC DIETHYLESTER 24.0 gs. (0.15 mol.) of tryptamine dissolved in 150 mls. of absolute alcohol were dripped in an atmosphere of nitrogen within 15 minutes while stirring and cooling with ice, to 32.4 gs. (0.15 mol.) of α-oxy-methylene-glutaric diethylester. After stirring for another hour at room temperature there was boiled with reflux for 45 minutes, whereupon the alcohol was removed in vacuo. The residue was dissolved in ether and subsequently washed with 0.1 N hydrochloric acid, saturated $NaHCO_3$-solution and water. After drying above $MgSO_4$ and distillation of the ether, the residue was distilled in high-vacuo over some pieces of anthracite.

This yielded the following fractions:

(1) 2.6 gs. boiling point up to 215°/0.05 mm., temperature of the bath up to 230°, enol positive.

(2) 24.6 gs. (0.069 mol. or 46%), boiling point 215° to 220°/0.05 mm., temperature of the bath 230°; viscous.

(3) 2.2 gs., boiling point 220°/0.05 mm., temperature of the bath 230° to 280°; vitreous. Residue 17 gs.

Analysis of fraction 2: Found C, 66.9, 66.6; H, 7.3, 7.2; N 7.8, 7.8.

$C_{20}H_{26}N_2O_4$ (358.42): Calculated C, 67.02; H, 7.31; N, 7.81.

(C) REDUCTION OF α-[12-(3-INDOLYL)-ETHYLAMINO-ETHYLENE]-GLUTARIC DIETHYLESTER 24.6 gs. (0.069 mol.) of enamine, obtained by (B), dissolved in 150 mls. of glacial acetic acid, was reduced at room temperature at a slight pressure above atmospheric pressure. $PtO_2$ as a catalyst was added in four portions each of 200 mgs. before and during reduction. The calculated amount of hydrogen was absorbed after 21 hours. The platinum was now drawn off and the icy acetic acid distilled in vacuo with the temperature rising slowly. At last, the temperature of the bath was maintained at 100° for another half an hour. The residue was dissolved in benzene and subsequently shaken with 1 N hydrochloric acid, saturated $NaHCO_3$-solution and water. Next, there was dried above $MgSO_4$, the solvent distilled and the residue distilled in high-vacuo. This yielded, substantially without distillation residue, 16.8 gs. of a vitreous mass with boiling point 220°/0.01 mm. From this could be obtained, by recrystallizing several times from benzene-petroleum ether 60° to 80°, 8.0 gs. (0.025 mol. or 36%) of a solid substance with melting point of 106° to 108° (1[2′(3″-indolyl)ethyl]5-carbaethoxy-α-piperidon-2).

Analysis: Found C, 68.3; H, 6.9; N, 8.9.

$C_{18}H_{22}N_2O_3$ (314.37): Calculated C, 68.77; H, 7.1; N, 8.9.

(D) BISCHLER-NAPIERALSKY RING CLOSURE 7.2 gs. (0.023 mol.) of the substance obtained by (C) was added in an atmosphere of nitrogen to 120 mls. of absolute benzene and 12 mls. of $POCl_3$. After 15 minutes stay there was boiled with reflux in an atmosphere of nitrogen. Subsequently, the mixture was poured into 300 gs. of ice and 25 mls. of 70%-ic $HClO_4$. The yellow solid substance was sucked off and washed with little water. The yield was 8.4 gs. of 3-carbaethoxy 1,2,3,4,6,7,12-heptahydro-pyrido (2,1-a) β-carbolinium perchlorate (0.021 mol. or 91%) with melting point 154° to 156°. After recrystallization from alcohol-water, the melting point increased to 156° to 158°.

Analysis: Found C, 54.5; H, 5.4; N, 6.9, 6.8; Cl, 8.9, 9.1.

$C_{18}H_{21}N_2O_6Cl$ (396.82): Calculated C, 54.48; H, 5.33; N, 7.06; Cl, 8.94.

(E) REDUCTION OF THE PERCHLORATE OBTAINED BY (D) WITH $LiAlH_4$

A suspension of 5.0 gs. (0.013 mol.) of the compound obtained by (D) in 350 mls. of absolute tetrahydrofurane was dripped within 15 minutes in an atmosphere of nitrogen to a solution of 2.8 gs. (0.074 mol.) of $LiAlH_4$ in 260 mls. of absolute tetrahydrofurane. The red solution was stirred for 15 minutes at room temperature and subsequently boiled with reflux. After 30 minutes the solution, which was now substantially decoloured, was dissociated in an ice-bath with 10 mls. of water, followed by sucking off and washing of the inorganic substance on a filter with in total 1 litre of tetrahydrofurane. The solutions of tetrahydrofurane were added together and acidified with 11 mls. of 2 N hydrochloric acid. Next day there was sucked off, which yielded after drying 3.51 gs. (0.012 mol. or 92%) of pure HCl-salt of 3-hydroxymethyl 1,2,3,4,6,7,12,12b-octahydropyrido (2.1 a)-β-carboline.

Analysis: Found C, 65.7; H, 7.4; N, 9.4; Cl, 12.1.

$C_{16}H_{21}N_2OCl$ (292.80): Calculated C, 65.63; H, 7.23; N, 9.57; Cl, 12.11.

(F) MANUFACTURE OF THE AMINE FROM THE HCl-SALT OBTAINED BY (E)

1.80 gs. (0.0061 mol.) of HCl-salt of the salt obtained by (E) were stirred for 25 minutes with a mixture of 8 mls. of 2 N ammonia and 50 mls of water, followed by sucking off and washing with 50 mls. of water. The yield was 1.34 gs. The washing water after a night's stay yielded another 0.04 g. Thus, in total 1.38 gs. (0.0054 mol or 89%) of the substance according to (E) were obtained.

Analysis: Found N, 10.5; 10.8.

$C_{16}H_{20}N_2O$ (256.34): Calculated N, 10.93.

*Example II*

By coupling in a similar manner as described in Example I (B), 6-methoxy-tryptamine, 5-methoxytryptamine, 5,6-dimethoxy-tryptamine, 6-chlorotryptamine, 5-fluorotryptamine, 6-hydroxytryptamine and 6-acetoxytryptamine with α-oxymethylene glutaric diethylester and carrying out with the reaction products the reactions described in Example I (C) to (F), there are obtained 10-methoxy-; 9-methoxy-; 9,10-dimethoxy-; 10-chlorine-; 5-fluoro-, 10-hydroxy- and 10-acetoxy-3-hydroxymethyl 1,2,3,4,6,7,12, 12b-octahydropyrido (2,1 a) B-carboline.

*Example III.*—Manufacture of 3,4,5,-Trimethoxy-Benzoic Ester From 3-Hydroxymethyl 1,2,3,4,6,7,12,12b-Octahydropyrido (2,1 a) β-Carboline 1.00 g. (0.0039 mol.) of the alcohol obtained as described in Example I was added in 5 portions while introducing nitrogen to a solution of 4.0 gs. (0.017 mol.) of 3,4,5,-trimethoxy-benzoylchloride in 35 mls. of absolute pyridine. Subsequently, nitrogen was introduced for approximately another half an hour until all the amine was dissolved, whereupon the solution was put aside at room temperature under nitrogen. During storage, a deposit was formed in the solution which had a slighly red colour. After 7 days, the pyridine was distilled under nitrogen in vacuo. The residue was dissolved in 200 mls. of chloroform and the red solution of chloroform was subsequently washed with a saturated $Na_2CO_3$ solution and water, followed by acidification with 70%-ic $HClO_4$. Next day there was sucked off and the deposit was washed with much chloroform and subsequently with little alcohol. Subsequently, the deposit was introduced into water and alkalized with 2 N ammonia. The aqueous solution was extracted with the aid of chloroform and the solution of chloroform washed with little water. After drying with $MgSO_4$, the solvent was removed in vacuo. The residue could be crystallized with little alcohol. Next day there was sucked off and the deposit washed with alcohol and ether. After crystallization from benzene-absolute alcohol, this yielded 1.19 gs. (0.0026 mol. or 67%) of the above-mentioned ester. After recrystallization from benzene the melting point, determined in vacuo, was 111° to 113° with decomposition.

Analysis: Found C, 68.5, 68.7; H, 6.9, 6.8; N, 6.1, 6.2.
$C_{26}H_{30}N_2O_5$ (450.52): Calculated C, 69.31; H, 6.71; N, 6.22.

*Example IV*

In a similar manner as described in Example III, from the alcohols obtained in the Examples I and II there are manufactured the esters of acetic acid, propionic acid, butyric acid, valerian acid, stearic acid, oxalic acid, succinic acid, glutaric acid, adipic acid, acrylic acid, crotonic acid, oil acid, citraconic acid, glycolic acid, tartaric acid, citronic acid, cyclopentane carbonic acid, cyclohexane-acetic acid, benzoic acid, o, m and p-methyl-benzoic acid, phtalic acid, o, m and p-hydroxybenzoic acid, phenyl-acetic acid, p-toluenesulphonic acid and 4,5-dimethoxyphenyl-propionic acid.

*Example V.—Manufacture of 3-Cyanomethyl-1,2,3,4,6,7, 12,12b Octahydropyrido (2,1 a) β-Carboline*

A stirred solution of 2.40 gs. (0.059 mol.) of the p-toluene-sulphonic-acid ester of 3-hydroxymethyl 1,2,3,4,6,7,12, 12b octahydropyrido (2.1 a) β-carboline and 33 gs. (0.51 mol.) of KCN in 550 mls. of alcohol was boiled with reflux in an atmosphere of nitrogen for 6 hours. After cooling there was sucked off and the solid substance thoroughly washed with benzene. Subsequently, the mother lye was substantially removed by distillation in vacuo. The distillation process was interrupted several times for sucking off the resulting solid substance. After the alcohol was substantially distilled, another 200 mls. of benzene were added and the resulting solution was washed with little water to remove the residual inorganic constituents. The benzene solution was concentrated in vacuo to 50 mls. After a night's stay there was sucked off and the deposit washed with benzene and absolute alcohol. This yielded 0.78 g. of solid material. Recrystallization from benzene yielded 0.64 g. (0.0024 mol. or 41%) of the above-mentioned compound, melting point 218° to 219° (in vacuo). Working up the mother lye yielded another 0.10 g. (0.0004 mol. about 7%) of a little less pure cyano-compound (melting point determined in vacuo: 210° to 213°).

Analysis: Found C, 76.7; H, 7.0; N, 16.0.
$C_{17}H_{19}N_3$ (265.37): Calculated C, 76.94; H, 7.22; N, 15.84.

*Example VI.—Manufacture of 3-Ethoxycarbonyl-1,2,3,4, 6,7,12,12b-Octahydropyrido (2,1 a) β-Carboline*

(A) PYRIDINE-2.5-DICARBONIC ACID

A three-neck flask of 3 litres, provided with a stirrer, a thermometer, a long air-cooler and a drop funnel, the stem of which extended to the base of the flask, had introduced into it 540 mls. of concentrated sulphuric acid (specific gravity 1.84) and, subsequently, 115 gs. (0.95 mol) of 5-ethyl-2-methyl-pyridine, 20 gs. (0.18 mol.) of $SeO_2$ and 100 mls. of real saltpetre acid. The mixture was carefully heated, while stirring, to a temperature of about 140°, at which a strong reaction set in. The flame was immediately removed from under the flask and the heating of the solution, which had become black in the meantime due to the isolated selenium, was not continued until the reaction had become less strong. At last, the solution was heated to 240° to 250° and at this temperature real saltpetre acid was slowly dripped to it. The dripping process must not be too slow, since otherwise free selenium is formed in the solution, and not too rapid, since otherwise nitrous vapours escape through the cooler.

The oxidation was completed after 10 to 11 hours. This could be tested by examining a sample strongly alkalized as to the smell of 5-ethyl-2-methyl-pyridine. In addition, when the reaction process is completed, the solution must no more become black due to isolated selenium, when the dripping of saltpetre acid is stopped.

In total about 300 mls. of real saltpetre acid were necessary for completing the oxidation.

Subsequently, the solution was cooled to about 170° and poured into 400 gs. of ice. After momentary boiling up for removing the nitrous vapours, the cooled solution was introduced into two gas-wasting flasks each of 1 litre, provided with a sintered glass plate. $SO_2$ was introduced into these flasks for 5 hours in order to isolate the selenium from the solution. The solution was introduced into a beaker and boiled for some time to render the selenium deposited more compact, whereupon the hot solution was drawn off through a G4-glass filter. The filtrate was tested as to the presence of $SeO_2$ by momentarily leading through $SO_2$. A solution of 500 gs. of NaOH in 500 mls. of water was dripped into the clear solution after having been diluted with 2 litres of water. After cooling of the solution, which had become warm, the pyridine-2.5-dicarbonic acid was sucked off. This must not be delayed too long (±3 hours), since otherwise sodium sulphate starts to crystallize.

The pyridine-2.5-dicarbonic acid, after washing with cold water was dried, above KOH at 100°. The yield was 110 gs. (0.66 mol. or 68%) of pyridine-2.5-dicarbonic acid, melting point 251° (decomp.).

(B) PYRIDINE-2.5-DICARBONIC DIMETHYLESTER 110 gs. (0.66 mol.) of the compound obtained by (A) was boiled with 1100 mls. of purified thionylchloride on a water-bath for 12 hours. After filtration through a G4-glass filter, in order to remove the small amount of non-dissolved substance, the thionylchloride was removed by distillation at first at normal pressure and later through a water-jet injector. The last residues of thionylchloride were removed by a night's stay of the residue in vacuo above KOH. The acid chloride, which had in the meantime solidified, was converted without further purification into the dimethylester by rapidly dripping to it 400 mls. of absolute methanol. After the strong reaction had ceased, there was boiled with reflux for another few minutes. Subsequently, the mixture was poured into 2 litres of water while stirring and the deposited methylester, after cooling, was sucked off and washed with much cold water (about 800 mls.). After drying at 100° in vacuo above KOH, the yield was 113 gs. of dimethylester. Recrystallization from methanol yielded 103 gs. (0.53 mol. or 80%) of pyridine 2.5-dicarbonic dimethylester with a melting point of 162° to 163°.

(C) 2.5-BIS-METHOXY-CARBONYLPIPERIDINE 30 gs. (0.15 mol.) of the compound obtained by (B), 8 gs. of Raney-nickel W2 and 150 mls. of dioxane were introduced into an autoclave of 1 litre. The ester was recrystallized from methanol with the addition of Raney nickel (6 gs./litre) and the dioxane, after having been purified in the usual manner, was distilled from the Raney nickel. After rinsing with hydrogen, a pressure of 145 atms. of hydrogen was provided, followed by slow heating of the autoclave while stirring. The absorption of hydrogen, started at 60°. After another half an hour the temperature had increased to 1150°, at which the reduction was completed. The autoclave was then cooled down in cold water and opened. The catalyst was removed by filtration and the resulting solution evaporated to dryness on the water-jet injector. Vacuum distillation of the residue yielded:

(1) 0.4 with boiling point (0.4 mm.) 100° to 105°, $n_D^{20}$ 1.4700

(2) 16.8 gs. with boiling point (0.4 mm.) 105° to 130°, $n_D^{20}$ 1.4775

(3) 7.5 gs. with boiling point (0.4 mm.) 130° to 148°, $n_D^{20}$ could not be determined.

Redistillation of fraction 2 yielded 13.0 gs. (0.065 mol. or 43%) of 2.5-bis-methoxy-carbonylpiperidine with boiling point (0.4 mm.) 104° to 106°; $n_D^{20}$ 1.4740.

(D) γ-BROMINE BUTYRIC ACID ETHYLESTER 81 gs. (1.0 mol.) of dry HBr were led into 86 gs. (1.0 mole.) of γ-butyrolactone on a boiling water-bath. After cooling, 119 gs. (1.0 mol.) of thionylchloride were rapidly dripped to it. Subsequently, after further heating at 100° for a quarter of an hour, 50 gs. (1.1 mol.) of "super dry" ethanol were dripped to the cooled solution, followed by again heating at 100° for a quarter of an hour and distillation in vacuo. The yield was:

(1) 4.1 gs. with boiling point (14 mm.) up to 88°

(2) 154 gs. (0.79 mol. or 79%) with boiling point (14 mm.) of 88°, $n_D^{20}$ 1.4560 (lit.: $n_D^{20}$ 1.4564).

(E) γ-(2.5-BIS-METHOXYPIPERIDINO)-BUTYRIC-ACID ETHYLESTER 25.0 gs. (0.12 mol.) of the substance obtained by (C), 25.0 gs. (0.13 mol.) of γ-bromine butyric-acid ethylester and 17.5 gs. (0.12 mol.) of baked $K_2CO_3$ were heated while stirring in an atmosphere of nitrogen on a boiling water-bath for 27 hours. After cooling, 100 mls. of icy water were added, followed by extraction with ether. The etherial solution was dried on $MgSO_4$ and the residue obtained after removal of the ether by distillation, was distilled in vacuo. This yielded:

(1) 0.5 g. with boiling point (0.7 mm.) to 163°, $n_D^{20}$ 1.4605.

(2) 31.5 gs. (0.10 mol. or 83%) with boiling point (0.7 mm.) of 163° to 165°, $n_D^{20}$ 1.4689.

Analysis of fraction 2: Found C, 57.1, 57.1; H, 7.9, 7.9; N, 4.4.

$C_{15}H_{25}NO_6$ (315.38): Calculated C, 57.12; H, 7.99; N, 4.44.

(F) 7-METHOXYCARBONYL-1-OXO-OCTAHYDRO-QUINOLIZINE 4.0 gs. (0.17 g. at.) of Na and 200 mls. of paraffin oil were introduced into a three-neck flask of 1 litre, whereafter the sodium was converted into NaH. A solution of 28.0 gs. (0.089 mol.) of the substance obtained by (E) in 75 mls. of toluene was subsequently dripped, in an atmosphere of nitrogen within a quarter of an hour, to the suspension of NaH which had cooled down to room temperature. The condensation was completed by boiling for another 5 hours with reflux. After cooling, the reaction mixture was dissociated by dripping to it successively 10 mls. of alcohol and 10 mls. of water while cooling in ice and stirring. Subsequently, 200 mls. of concentrated hydrochloric acid were added and the reaction mixture was boiled with reflux until the $CO_2$-development had ceased. Such was the case after from 4 to 6 hours. The mixture was then cooled and the aqueous layer separated from the layer of paraffin-toluene, whereafter this layer was washed once more with little 2 N hydrochloric acid. The collected layer of hydrochloric acid, after having been washed several further times with petroleum ether of 40° to 60°, was evaporated to dryness in vacuo. The evaporating process had to be interrupted several times to remove by filtration the deposited NaCl. The residue was subsequently boiled with a mixture consisting of 500 mls. of absolute alcohol, 200 mls. of benzene and 12 mls. of concentrated sulphuric acid for 4 hours. After distillation of 150 mls., the esterifying process was continued for another 3 hours. Then again 250 mls. were removed by distillation and, after cooling, the residue was poured into a mixture of 400 mls. of water and 400 gs. of ice. The solution was alkalized with half-concentrated ammonia and then extracted with the aid of ether. The etherial solution, after drying on $MgSO_4$, was evaporated to dryness in vacuo, whereupon the residue was distilled in vacuo. The yield was:

(1) 0.9 g. with boiling point (0.5 mm.) of 110° to 112°, $n_D^{20}$ 1.4846

(2) 8.3 gs. with boiling point (0.5 mm.) of 112° to 114°, $n_D^{20}$ 1.4873

(3) 3.0 gs. with boiling point (0.5 mm.) of 114° to 126°, $n_D^{20}$ 1.4878

Thus, in total 11.3 gs. (0.050 mol. or 56%) of 7-methoxycarbonyl - 1 - oxo-octahydroquinolizine were obtained. Since brown colouring occurred very soon in air, the light-yellow oil had to be stored at −20° in an atmosphere of nitrogen.

Analysis of fraction 2: Found C, 64.2, 64.1; H, 8.9, 8.9; N, 6.1.

$C_{12}H_{19}NO_3$ (225.29): Calculated C, 63.97; H, 8.50; N, 6.22.

(G) PHENYLHYDRAZONE OF 7-METHOXY-1-OXO-OCTAHYDROQUINOLIZINE

A mixture consisting of 3.60 gs. (0.016 mol.) of the substance obtained by (F), 1.80 gs. (0.017 mol.) of phenylhydrazine, 2.50 gs. (0.042 mol.) of icy acetic acid and 70 mls. of alcohol was boiled for 25 minutes in an atmosphere of nitrogen with reflux. The mixture was then cooled in ice and, after being supplemented with absolute ether up to a volume of 400 mls., 7.2 gs. of 70%-ic $HClO_4$ were added. The $HClO_4$-salt of the phenyl-hydrazone, after storage in an ice-box for 3 hours, was drawn off, washed with absolute ether and dried. This yielded 3.37 gs. (0.0081 mol. or 51%) of $HClO_4$-salt of the above-mentioned phenylhydrazone.

Analysis: Found N, 9.8, 9.8.

$C_{18}H_{26}ClN_3O_6$ (415.89): Calculated N, 10.10.

(H) 3-ETHOXYCARBONYL-1,2,3,4,6,7,12,12b-OCTAHYDRO-PYRIDO (2.1a) β-CARBOLINE 0.100 g. (0.00024 mol.) of the substance obtained by (G) was stored at room temperature under nitrogen with 3.0 mls. of alcohol saturated with dry HCl for 16 hours. Then 20 mls. of absolute ether were added and the resulting deposit was drawn off after several hours stay. Treatment with 1 ml. of 1 N $NH_4OH$, after sucking off, washing with water and drying, yielded 0.026 g. (0.000087 mol. or 36%) of the above-mentioned compound with a melting point of 164° to 165°.

*Example VII.—3-Ethoxycarbonyl-1,2,3,4,6,7,12,12b-Octahydropyrido (2.1 a) β-Carboline*

If the 3-carbaethoxy-1,2,3,4,6,7,12-hepta-hydropyrido (2.1 a) β-carbolinium-perchlorate, obtained as described in Example I(D), is reduced with zinc and perchloric acid instead of LiAlH₄, as described in Example I(E), the double bond in ring D is reduced selectively, the carbaethoxy-group at the 3-position being retained.

2.5 mls. of 70%-ic $HClO_4$ were dripped to a mixture consisting of 2.0 gs. (0.0050 mol.) of the compound obtained by the method of Example I(D), 25 mls. of acetone, 25 mls. of tetrahydrofurane, 22 mls. of water and 2.5 gs. of zinc, followed by heating to 50° to 55° while stirring. The solution, which was initially yellow, was substantially decoloured after 65 minutes. Subsequently, the non-dissolved material was drawn off and the filtrate evaporated to dryness in vacuo at 30° to 40°, until 2 layers started to separate. The aqueous layer was decanted and the residual oil was washed with water twice. The oil was finally crystallized by treatment, after having been mixed with 2 mls. of alcohol, with 100 mls. of water. After the crystallization process was completed, the mother lye was decanted and the residue, after stirring with ether, was drawn off (1.4 gs.). Fractionated crystallization from alcohol-benzene yielded 0.93 g. (0.0023 mol. or 46%) of HClO$_4$ salt of 3-carbaethoxy-1,2,3,4,6,7,12,12b-octahydropyrido (2.1 a) β-carboline with melting point of 232° to 233°. With lye the free base with a melting point of 164° to 165° was obtained therefrom.

Analysis: Found C, 72.5, 72.5; H, 7.7, 7.7; N, 9.2, 9.3. C$_{18}$H$_{22}$N$_2$O$_2$ (298.37): Calculated C, 72.45; H, 7.43; N, 9.39.

The I.R. absorption spectrum showed a C=O ester absorption at 1700 cm.$^{-1}$ and a NH absorption at 3390 cm.$^{-1}$.

The compounds may be used not only as free bases, but also in the form of their salts, preferably as non-toxic acid-addition compounds, for example as their hydrochloric-acid, citronic-acid or acetic-acid salts.

As pharmaceutical preparations they are worked, for example, into tablets each of 225 mgs., which contain 50 mgs. of the active compound in addition to normal carriers such as lactose, saccharose, starch, talc and/or magnesium stearate.

For parenteral use there are manufactured, for example, injection liquids containing from 10 to 50 mgs. of active substance according to the invention per millilitre of liquid and an amount of sodium chloride sufficient to make the solution isotonic with blood.

What is claimed is:

3-cyanomethyl - 1,2,3,4,6,7,12,12b - octahydropyrido (2.1-a) β-carboline.

References Cited in the file of this patent

UNITED STATES PATENTS 2,908,686   Cohen et al. _____ Oct. 13, 1959

OTHER REFERENCES

Groves et al.: Jour. Chem. Soc. (London), pages 650–661 (1952).

Goutarel et al.: Helv. Chim. Acta, vol. 37, pages 1805–1810 (1954).

Glover et al.: Jour. Chem. Soc. (London), pages 1750–1754 (1958).

Wenkert et al.: J. Am. Chem. Soc., volume 80, page 3484 (1958).

Wenkert et al.: Jour. Am. Chem. Soc., vol. 81, pages 1474–1477 (1959).

UNITED STATES PATENT OFFICE
CERTIFICATE OF CORRECTION

Patent No. 3,120,538                        February 4, 1964

Jan Strating

It is hereby certified that error appears in the above numbered patent requiring correction and that the said Letters Patent should read as corrected below.

Column 1, line 67, for "valeric acid with" read -- valeric acid or with --; column 2, lines 7 and 8, for "therepeutically" read -- therapeutically --; column 7, line 46, for "12-(3-INDOLYL)" read -- 1-(3-INDOLYL) --.

Signed and sealed this 28th day of July 1964.

(SEAL)

Attest:

ESTON G. JOHNSON                                EDWARD J. BRENNER
Attesting Officer                                    Commissioner of Patents